(12) United States Patent
Hamers et al.

(10) Patent No.: US 11,513,490 B2
(45) Date of Patent: *Nov. 29, 2022

(54) I/O MESH ARCHITECTURE FOR A SAFETY INSTRUMENTED SYSTEM

(71) Applicant: Honeywell International Inc., Morris Plains, NJ (US)

(72) Inventors: Adrianus Cornelis Maria Hamers, Morris Plains, NJ (US); Joseph Felix, Morris Plains, NJ (US); Aad van Wensen, Morris Plains, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 297 days.

This patent is subject to a terminal disclaimer.

(21) Appl. No.: 16/827,934

(22) Filed: Mar. 24, 2020

(65) Prior Publication Data

US 2021/0302932 A1 Sep. 30, 2021

(51) Int. Cl.
*G05B 19/05* (2006.01)

(52) U.S. Cl.
CPC .. *G05B 19/054* (2013.01); *G05B 2219/14006* (2013.01); *G05B 2219/14014* (2013.01)

(58) Field of Classification Search
USPC .......................................................... 700/19
See application file for complete search history.

(56) References Cited

U.S. PATENT DOCUMENTS

| | | | |
|---|---|---|---|
| 7,436,797 B2 | 10/2008 | Shepard et al. | |
| 7,515,972 B2 | 4/2009 | Kumar et al. | |
| 7,555,752 B2 | 6/2009 | Groot et al. | |
| 8,280,530 B2 * | 10/2012 | Kase | G05B 19/0423 700/19 |
| 9,665,089 B2 | 5/2017 | Schreder et al. | |
| 9,873,346 B2 | 1/2018 | Maekawa et al. | |
| 9,875,207 B2 | 1/2018 | Lv et al. | |
| 10,175,682 B2 | 1/2019 | Peake et al. | |
| 10,176,606 B2 | 1/2019 | Jammikunta et al. | |

(Continued)

OTHER PUBLICATIONS

Extended European Search Report dated Aug. 27, 2020 for corresponding EP Application No. 20166894.4 (9 pages total).

(Continued)

*Primary Examiner* — Abul Azad

(74) *Attorney, Agent, or Firm* — John Maldjian; Stevens & Lee PC

(57) ABSTRACT

A safety instrumented system (SIS) includes safety controllers, and safety input/output (I/O) modules coupled to safety field devices that are coupled in parallel with a process control system's field devices to processing equipment which is configured and controlled to run a process. An I/O mesh network between the safety controllers and the safety I/O modules is configured for selecting any safety controller to become coupled to any safety I/O module to function as a pool of safety I/O modules so that any safety controller is configurable to receive sensor signals from and transmit control signals to any safety field device. The safety field devices are for monitoring process variable(s) for the process so that when one of the safety controllers recognizes a hazardous condition regarding the processing equipment, the SIS independently takes action to keep the processing equipment under control or bring it to a safe state.

17 Claims, 6 Drawing Sheets

(56) References Cited

U.S. PATENT DOCUMENTS

| | | |
|---|---|---|
| 10,178,177 B2 | 1/2019 | Mclaughlin et al. |
| 10,237,712 B2 | 3/2019 | Gopalakrishnan et al. |
| 10,441,832 B1 | 10/2019 | Trivelpiece et al. |
| 10,565,046 B2 | 2/2020 | Tran et al. |
| 11,036,656 B2 | 6/2021 | McLaughlin et al. |
| 2004/0158713 A1* | 8/2004 | Aneweer .............. G05B 23/027 726/28 |
| 2005/0276233 A1 | 12/2005 | Shepard et al. |
| 2011/0178611 A1* | 7/2011 | Daraiseh ............ G05B 19/0428 700/79 |
| 2015/0018977 A1* | 1/2015 | Law .................... G05B 19/402 700/12 |
| 2015/0278144 A1 | 10/2015 | Mclaughlin et al. |
| 2016/0139999 A1* | 5/2016 | Gabler .................... G05B 9/00 714/4.11 |
| 2016/0327923 A1* | 11/2016 | Papenbreer ........... G06F 3/0679 |
| 2018/0259923 A1 | 9/2018 | De et al. |
| 2018/0324609 A1 | 11/2018 | Diancin |
| 2019/0104437 A1 | 4/2019 | Bartfai-Walcott et al. |
| 2019/0140989 A1* | 5/2019 | Wise .................... H04L 51/066 |
| 2019/0174207 A1 | 6/2019 | Celia et al. |
| 2019/0245716 A1 | 8/2019 | Coombes et al. |
| 2019/0274084 A1 | 9/2019 | Daniels et al. |
| 2019/0340269 A1 | 11/2019 | Biernat et al. |
| 2020/0026575 A1 | 1/2020 | Guim et al. |
| 2020/0029086 A1 | 1/2020 | Zou et al. |
| 2020/0236162 A1 | 7/2020 | Bouzon et al. |
| 2020/0333765 A1 | 10/2020 | Biernat et al. |

OTHER PUBLICATIONS

Extended European Search Report dated Jul. 9, 2021 for corresponding EP Application No. 21164736.7 (8 pages total).

* cited by examiner

I/O MESH ARCHITECTURE FOR A SAFETY INSTRUMENTED SYSTEM

FIELD

This Disclosure relates to industrial automation systems including process control systems, and in particular to a safety instrumented system (SIS) as an additional component of an industrial automation system.

BACKGROUND

Processing facilities, or industrial plants, are typically managed using industrial automation systems. Example processing facilities include manufacturing plants, chemical plants, crude oil exploration, production and refining facilities, ore processing plants and power generation stations.

Various process industries have seen constant growth in industrial automation technology. In particular, there is a need to move to more capitally efficient systems and to provide designs that have compatibility with modular unit construction techniques. However, it is often challenging to provide the necessary level of industrial automation while remaining capitally efficient and providing for modular construction.

A safety instrumented system (SIS) as known in the art of industrial automation systems is a system configured to take automatic action to keep the processing equipment controlled by a process control system in a safe operating state, or to render the processing equipment to be in a safe operating state, when abnormal conditions are detected. The SIS may implement a single safety function or multiple safety functions to protect against various hazards that can occur regarding the processing equipment in the plant. A SIS is also known as a safety shutdown system, emergency shutdown system, safety interlock, protective instrumented system, fire and gas detection system, or safety critical system.

A SIS is generally independent of the process control system with its own actuators and sensors that monitors a subset of the process variables also monitored by the process control system. The SIS when it detects a hazardous condition or a potentially hazardous condition can independently take action to keep the processing equipment under control or bring it to a safe state, thus functioning as an independent safety system.

In general, the SIS uses different hardware technologies as compared to the process control system to reduce the effect of common cause failures with the process control system. At a minimum, the SIS includes apparatus and devices for operating at level 1 of the Purdue model providing lowest level controllers (level 1 controllers), and includes its own field devices (sensors and actuators; considered to be Purdue level 0 along with the processing equipment) directly coupled to the SIS level 1 controllers. The SIS generally also includes controllers in level 3 of the Purdue model. The SIS is connected in parallel with respect to the process control system's field devices to the processing equipment which enables it to independently control the processing equipment when it is determined a hazardous condition or a potentially hazardous condition is present.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects recognize conventional SIS solutions have a fixed relationship between the safety I/O modules and the safety controllers. This requires dedicated communication structures and manual configurations (e.g. the configuration of the needed information exchange) in the case where a safety controller wants to use points from a safety I/O module connected to another safety controller. As used herein, points (or points of control) as known in the art of industrial automation is a term used to describe a control operation, whether it be a sensing action or a controlling action, where a point can be anything from a temperature or pressure sensor, to an output of a proportional controller controlling operation of a control valve. Output points are generally always dedicated to the safety controller where the output is connected. This conventional SIS arrangement necessitates significant upfront architecture and design work to make it as efficient as possible with an acceptable cost. A conventional SIS arrangement also reduces availability because using an I/O point of another controller also requires that the other controller is operating correctly.

Disclosed aspects include a SIS comprising an I/O mesh network that allows any of the safety controllers to utilize any of the I/O points from the plurality of safety I/O modules so that the safety I/O modules collectively function as a pool (or Honeywell International's Highly Integrated Virtual Environment (HIVE)) of safety I/O modules. In some disclosed embodiments any of the I/O points provided by any of the plurality of safety I/O modules can be utilized by any of the safety controllers. This I/O mesh network allows the I/O points of the safety I/O modules to also be available for any of the controllers in the process control system, and also allows the SIS I/O points to be used in the process control system as if being process control system I/O points on its own I/O mesh network.

One disclosed aspect comprises a SIS including safety controllers, and safety I/O modules coupled to safety field devices that are coupled to processing equipment in a process control system that runs a process. An I/O mesh network is between the safety controllers and the safety I/O modules. The I/O mesh network is configured for selecting any safety controller to become coupled to any safety I/O module to function as a pool of safety I/O modules so that any safety controller is configurable to receive sensor signals from and transmit control signals to any safety field devices. The safety field devices are for monitoring at least one process variables for the process so that when one of the safety controllers recognizes a hazardous condition regarding the processing equipment, the SIS independently takes action to keep the processing equipment under control or to bring it to a safe state.

DETAILED DESCRIPTION

Figure 1A:
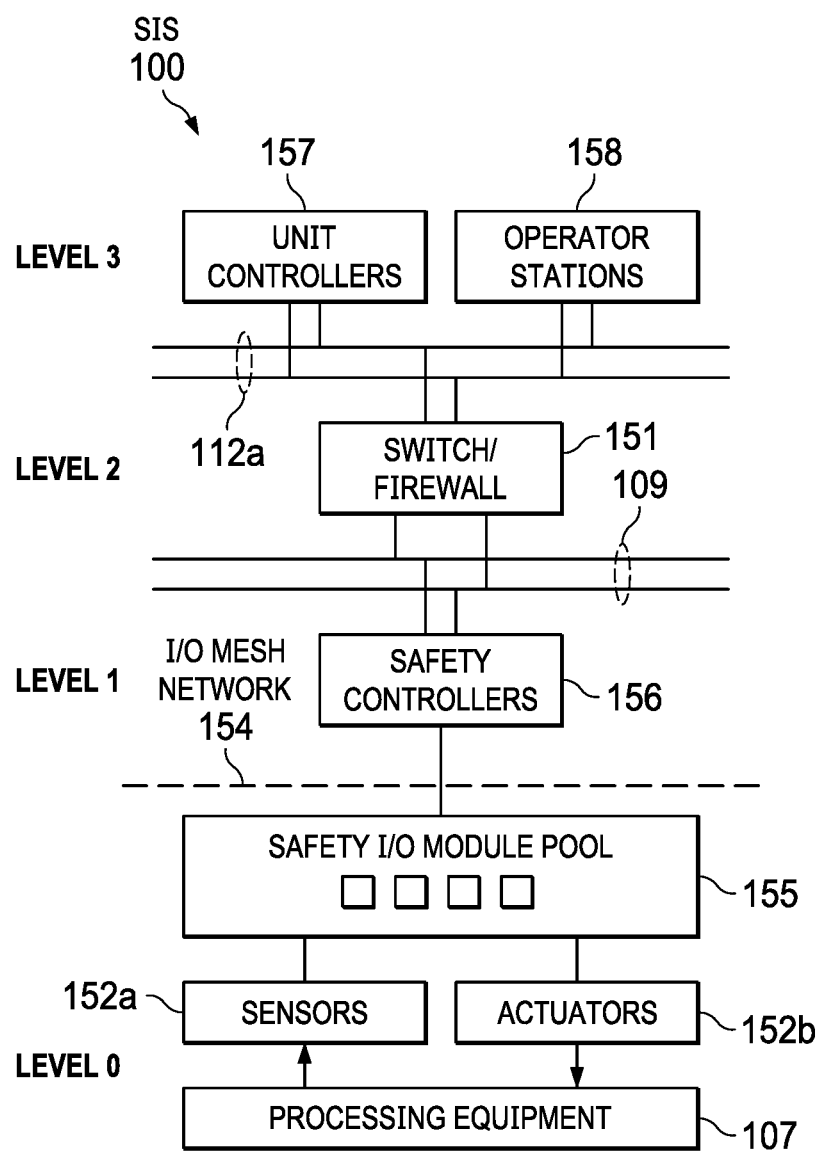
FIG. 1A illustrates an example SIS including an I/O mesh architecture for a safety control system.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

A SIS for industrial automation systems is an important feature of today's industrial processing plants. There is recognized herein a need for SIS for industrial automation systems to provide an independent safety control system connected, in parallel with respect to the process control system's field devices to the processing equipment.

Figure 1B:
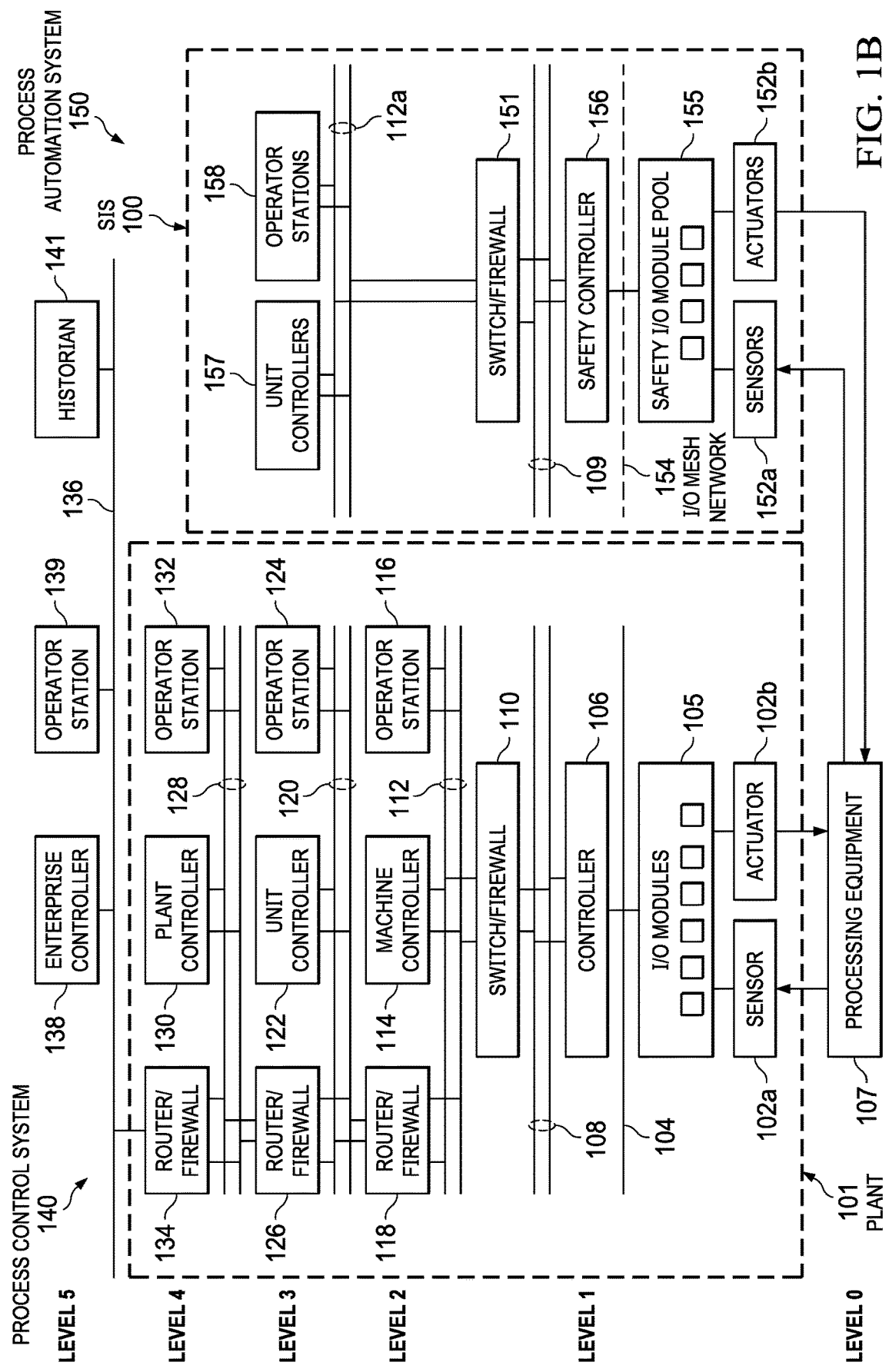
FIG. 1B illustrates a process automation system including a process control system and the example SIS including the I/O mesh architecture shown in FIG. 1A which is connected in parallel with respect to the process control system's field devices to the processing equipment. The SIS can move the processing equipment to a safe state after an emergency or other abnormal condition is detected in the processing equipment.

FIG. 1A illustrates an example SIS 100 that includes an I/O mesh architecture shown as I/O mesh network 154 for implementing at least one safety function to protect against various hazards that can occur in processing equipment in a process control system, according to this Disclosure. FIG. 1B illustrates a process automation system 150 including a process control system 140 and the SIS 100 with the I/O mesh network 154 shown in FIG. 1A which is connected in parallel with respect to the process control system's 140 field devices to the processing equipment 107 for implementing at least one safety function for the processing equipment 107. The SIS 100 is configured to move the process being run to a safe state after an emergency or other abnormal condition is detected in the processing equipment 107, which was not handled by the process control system 140.

As shown in FIGS. 1A and 1B, the SIS 100 includes various components that provide an independent safety network for keeping the operation of the processing equipment 107 safe, where the processing equipment 107 is configured controlled to process at least one generally tangible product or other material. For instance, the SIS 100 is used to facilitate independent safety control over the processing equipment 107 in one plant, shown as plant 101 in FIG. 1B. In the case of multiple plants, each plant generally has its own dedicated SIS 100.

In FIG. 1A, the SIS 100 is shown implemented using the Purdue model of process control, comprising level 3, level 2 and level 1, and level 0 including field devices (sensors 152a and actuators 152b) and processing equipment 107. In FIG. 1B the process automation system 150 is shown including its process control system 140 implemented in the Purdue model comprising levels 1 to 5, where the SIS 100 is connected in parallel with respect to the process control system's field devices shown as sensor 102a and actuator 102b to the processing equipment 107.

"Level 0" generally includes field devices comprising one or more sensors and one or more actuators, shown for the process control system as sensors 102a and actuators 102b, and for the SIS as sensors 152a and actuators 152b. The sensors 102a, 152a and actuators 102b, 152b represent components in the process automation system 150 that may perform any of a wide variety of functions. For example, the sensors 102a, 152a can measure a wide variety of characteristics in the processing equipment 107, such as temperature, pressure, or flow rate. Also, the actuators 102b, 152b can alter a wide variety of characteristics in the processing equipment 107.

The sensors 102a, 152a and actuators 102b, 152b can represent any other or additional components in any suitable process automation system. Each of the sensors 102a, 152a includes any suitable structure for measuring one or more characteristics in the processing equipment 107. Each of the actuators 102b, 152b includes any suitable structure for operating on or affecting one or more conditions in the processing equipment 107. The sensors 102a, 152a and actuators 102b, 152b may be generally be collectively referred to as being "field devices."

The SIS 100 includes an I/O mesh network 154 that enables coupling any of the plurality of I/O modules in the I/O module pool 155 to the sensors 152a and actuators 152b. The I/O mesh network 154 thus facilitates interaction of any of the safety controllers 156 with the sensors 152a and actuators 152b. For example, the I/O mesh network 154 can transport measurement data from the sensors 152a to any of the safety controllers 156 which in response can provide control signals to any of the actuators 152b. The sensors 152a and the actuators 152b (as well as the sensors 102a and actuators 102b in the process control system 140) are each coupled to the processing equipment 107.

The safety controllers 156 are configured to trigger a safety action to protect against various hazards that can occur in the process control system 140 generally due to the processing equipment 107. The safety controllers 156 generally comprises a microprocessor specifically designed to comply with internal safety standards such as the IEC61508 which is an international standard for the "functional safety" of electrical, electronic, and programmable electronic equipment. For example, the safety controllers 156 can comprise the Honeywell International SAFETY MANAGER SC.

The I/O mesh network 154 can represent any suitable network or combination of networks. As particular examples, the I/O mesh network 154 can represent an Ethernet network, an electrical signal network (such as a HART or FOUNDATION FIELDBUS network), a pneumatic control signal network, or any other or additional type(s) of communication network(s).

Among other things, each of the safety controllers 156 may use the measurements from one or more sensors 152a to control the operation of one or more actuators 152b. For example, a safety controller can receive measurement data from one or more sensors 152a and use the measurement data to generate control signals for one or more actuators 152b.

Safety controllers 156 can operate in a non-redundant or in a redundant mode of operation. For the redundant mode of operation two different methodologies can be applied: 1) a hot standby (with a primary and secondary controller), where the secondary controller is synchronized periodically to the primary controller, and this involves a switch-over mechanism), and 2) a parallel operation, where both controllers run the same software and are continuously synchronized and therefore do not require switch-over time and thus providing a constant reaction time even in case of faults of one of the safety controllers 156. Each of the safety controllers 156 includes any suitable structure for interacting with one or more sensors 152a and controlling one or more actuators 152b.

For the SIS 100, besides the I/O mesh network 154, there is a network 109 shown between the safety controllers 156 and the switch/firewall 151, and another network 112a between the switch/firewall 151 and the level 3 devices including the unit controllers 157 and operator stations 158.

The networks 109, 112a for the SIS 100 and networks 108, 112, 120 and 128 for the process control system 140 shown in FIG. 1B are only as an example shown with redundant network paths to represent FAULT TOLERANT ETHERNET (FTE) from Honeywell International. FTE is optional because a single network can also be used for any of these networks. Thus, for sending information, network 112a couples the unit controller 157 shown in level 3 via the switch/firewall 151 positioned between level 1 and level 2 to the safety controllers 156 shown in level 1. The network 108 associated with the process control system 140 couples the machine controllers 114 through the switch/firewall 110 to the controllers 106, and the networks 112 couple the machine controllers 114 to the switch/firewall 110, networks 120 couple unit controller 122 machine controllers 114, and the networks 128 coupled the plant controller 130 to the unit controller 122. The networks 112a, 108, 112, 120, 128 can represent any suitable network or combination of networks.

In some embodiments network 109 or network 112a in the SIS 100 and network 108 or network 112 in the process control system 140 can be the same network. In this arrangement, the process control system's 140 controllers 106 or its machine controllers 114 and the safety controllers 156 of the SIS 100 can thus participate in peer-to-peer communications.

For the process control system 140 at least one switch/firewall 110 couples the networks 108 to other networks 112, both of these networks 108, 112 shown as being FTE. The switch/firewall 110, like switch/firewall 151, may transport traffic from one network to another. The switch/firewall 110 may also block traffic on one network from reaching another network. The switch/firewall 110 like switch/firewall 151, includes any suitable structure for providing communication between networks, such as a HONEYWELL CONTROL FIREWALL (CF9) device.

In the Purdue model, as shown for the process control system 140, "Level 2" may include one or more machine controllers 114 coupled to the networks 112. The machine controllers 114 perform various functions to support the operation and control of the controllers 106, sensors 102a, and actuators 102b, which can be associated with a particular piece of processing equipment 107 (such as a boiler or other machine). For example, the machine controllers 114 can log information collected or generated by the controllers 106, such as measurement data from the sensors 102a, or control signals for the actuators 102b.

For level 2 the SIS 100 shown in FIG. 1B (and in FIG. 1A described above) includes the switch/firewall 151, that can be alternatively positioned between level 1 and level 2. For the process control system 140, on level 2, one or more operator stations 116 are coupled to the networks 112. The operator stations 116 represent computing or communication devices providing user access to the machine controllers 114, which can then provide user access to the controllers 106, and via network 104 through the I/O modules 105 to the sensors 102a and actuators 102b. As particular examples, the operator stations 116 can allow users to review the operational history of the sensors 102a and actuators 102b using information collected by the controllers 106 and/or the machine controllers 114.

The operator stations 116 can also allow the users to adjust the operation of the sensors 102a, actuators 102b, safety controllers 106, or machine controllers 114. In addition, the operator stations 116 can receive and display warnings, alerts, or other messages or displays generated by the safety controllers 106 or the machine controllers 114. Each of the operator stations 116 includes any suitable structure for supporting user access and control of one or more components in the system 100. Each of the operator stations 116 can, for example, represent a computing device running a MICROSOFT WINDOWS operating system.

At least one router/firewall 118 couples the networks 112 to networks 120. The router/firewall 118 includes any suitable structure for providing communication between networks, such as a secure router or combination router/firewall. The networks 120 can represent any suitable networks, such as a pair of Ethernet networks or an FTE network.

Both the SIS 100 and process control system 140 include Purdue model "Level 3." The process control system 140 may include one or more unit controllers 122 coupled to the networks 120, while the SIS 100 unit controllers 157 coupled to networks 112a. The SIS 100 also includes operator stations 158 coupled to networks 112a. Each unit controller 122, 157 is typically associated with a process unit, where a process unit represents a collection of different machines operating together to implement at least part of a process.

The unit-level controllers 122, 157 perform various functions to support the operation and control of components in the lower levels. For example, the unit-level controllers 122, 157 can log information collected or generated by the components in the lower levels, execute applications that control the components in the lower levels, and provide secure access to the components in the lower levels. Each of the unit-level controllers 122, 157 includes any suitable structure for providing access to, control of, or operations related to one or more machines or other pieces of equipment in a process unit. Each of the unit-level controllers 122, 157 can, for example, represent a server computing device running a MICROSOFT WINDOWS operating system. Although not shown, different unit-level controllers 122, 157 can be used to control different units in a process system, where each unit is associated with one or more machine controllers 114, safety controllers 106, sensors 102a, and actuators 102b for the process control system 140, and regarding the SIS 100 the safety controllers 156, sensors 152a and actuators 152b for the SIS 100).

Regarding the process control system 140, access to the unit-level controllers 122 may be provided by one or more operator stations 124. Similarly, for the SIS 100, access to the unit-level controllers 157 may be provided by one or more operator stations 158. Each of the operator stations 124, 158 includes any suitable structure for supporting user access and control of one or more components in the process control system 140, and SIS 100, respectively. Each of the operator stations 124, 158 can, for example, represent a computing device running a MICROSOFT WINDOWS operating system.

In the process control system 140, at least one router/firewall 126 couples the networks 120 to networks 128. The router/firewall 126 includes any suitable structure for providing communication between networks, such as a secure router or combination router/firewall. The networks 128 can represent any suitable networks, such as a pair of Ethernet networks or an FTE network.

The process control system 140 is also shown including Purdue model, "Level 4" including one or more plant controllers 130 coupled to the networks 128. Each plant controller 130 is typically associated with the plant 101, which may include one or more process units that implement the same, similar, or different processes. The plant controllers 130 perform various functions to support the operation and control of components in the lower levels. As particular examples, the plant controller 130 can execute one or more manufacturing execution system (MES) applications, scheduling applications, or other or additional plant or process control applications. Each of the plant controllers 130 includes any suitable structure for providing access to, control of, or operations related to one or more process units in a process plant. Each of the plant controllers 130 can, for example, represent a server computing device running a MICROSOFT WINDOWS operating system.

Access to the plant controllers 130 may be provided by one or more operator stations 132. Each of the operator stations 132 includes any suitable structure for supporting user access and control of one or more components in the SIS 100. Each of the operator stations 132 can, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 can represent any suitable network, such as an enterprise-wide Ethernet or other network or all or a portion of a larger network (such as the Internet).

The process control system 140 is also shown including components in the Purdue model, "Level 5" including one or more enterprise controllers 138 coupled to the network 136. Each enterprise controller 138 is typically able to perform planning operations for plant 101 to control various aspects of the plant 101. As particular examples, the enterprise controller 138 can execute one or more order processing applications, enterprise resource planning (ERP) applications, advanced planning and scheduling (APS) applications, or any other or additional enterprise control applications. Each of the enterprise controllers 138 includes any suitable structure for providing access to, control of, or operations related to the control of the plant.

Access to the enterprise controllers 138 may be provided by one or more operator stations 139. Each of the operator stations 139 includes any suitable structure for supporting user access and control of one or more components in the SIS 100. Each of the operator stations 139 can, for example, represent a computing device running a MICROSOFT WINDOWS operating system.

Various levels of the Purdue model can include other components, such as one or more databases. The database(s) associated with each level can store any suitable information associated with that level or one or more other levels of the process automation system 150. For example, a data historian 141 can be coupled to the network 136. The data historian 141 can represent a component that stores various information about the process control system 140 and optionally also regarding the SIS 100. The data historian 141 can, for instance, store information used during production scheduling and optimization and abnormal situations regarding the processing equipment 107. The data historian 141 represents any suitable structure for storing and facilitating retrieval of information.

Figure 1C:
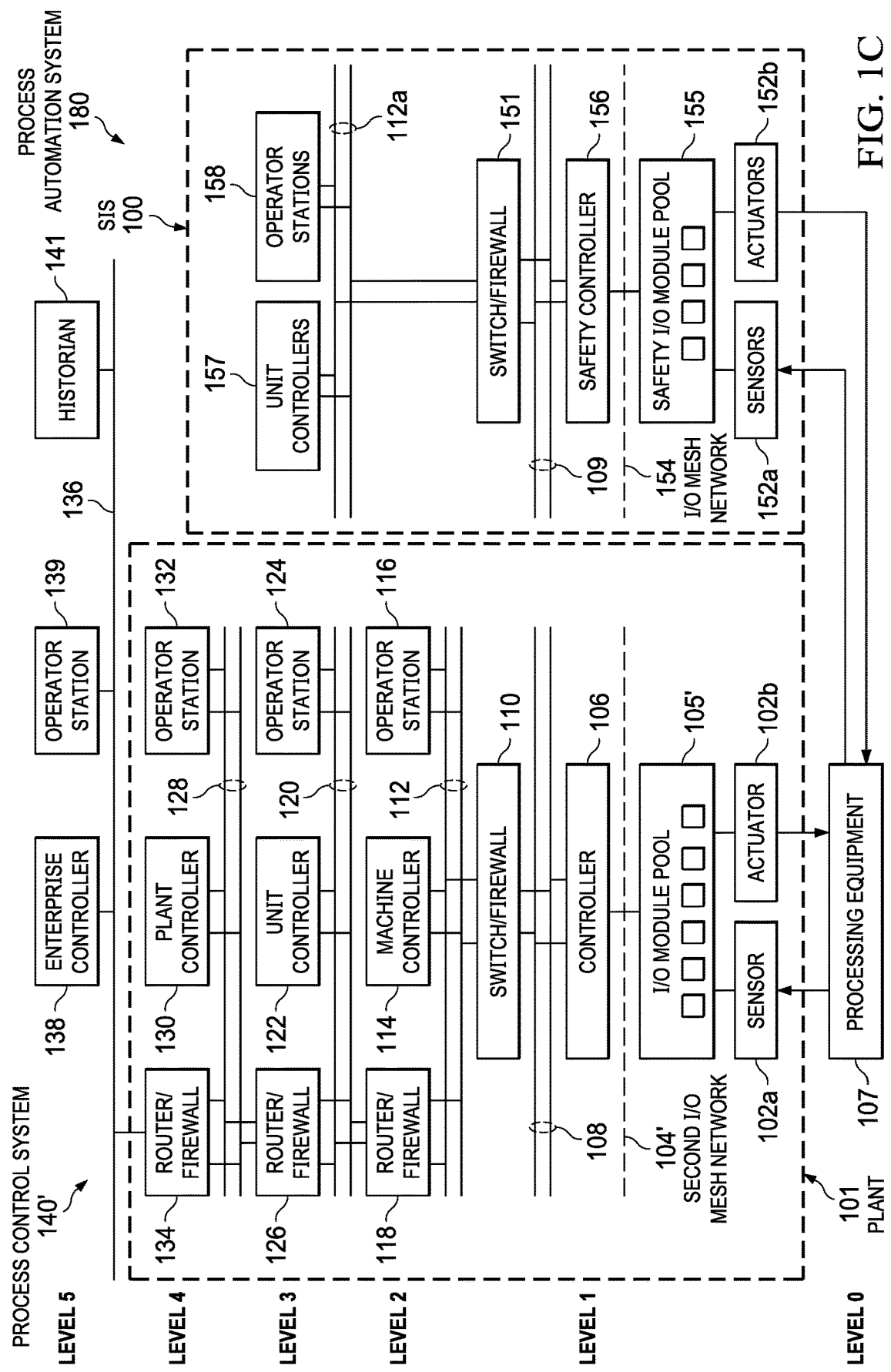
FIG. 1C illustrates another process automation system including a process control system and the example SIS that includes the I/O mesh architecture shown in FIG. 1A which is connected in parallel with respect to the process control system's field devices to the processing equipment, where the process control system includes an optional I/O mesh network shown as a second I/O mesh network, and I/O module pool.

FIG. 1C illustrates another process automation system 180 including a process control system shown as 140' that includes an optional second I/O mesh network 104' and I/O module pool 105', together with SIS 100 that as described above includes the I/O mesh network 154 shown in FIG. 1A. SIS 100 is connected in parallel to the process control system's 140' field devices 102a, 102b that are coupled to the processing equipment 107.

Figure 2A:
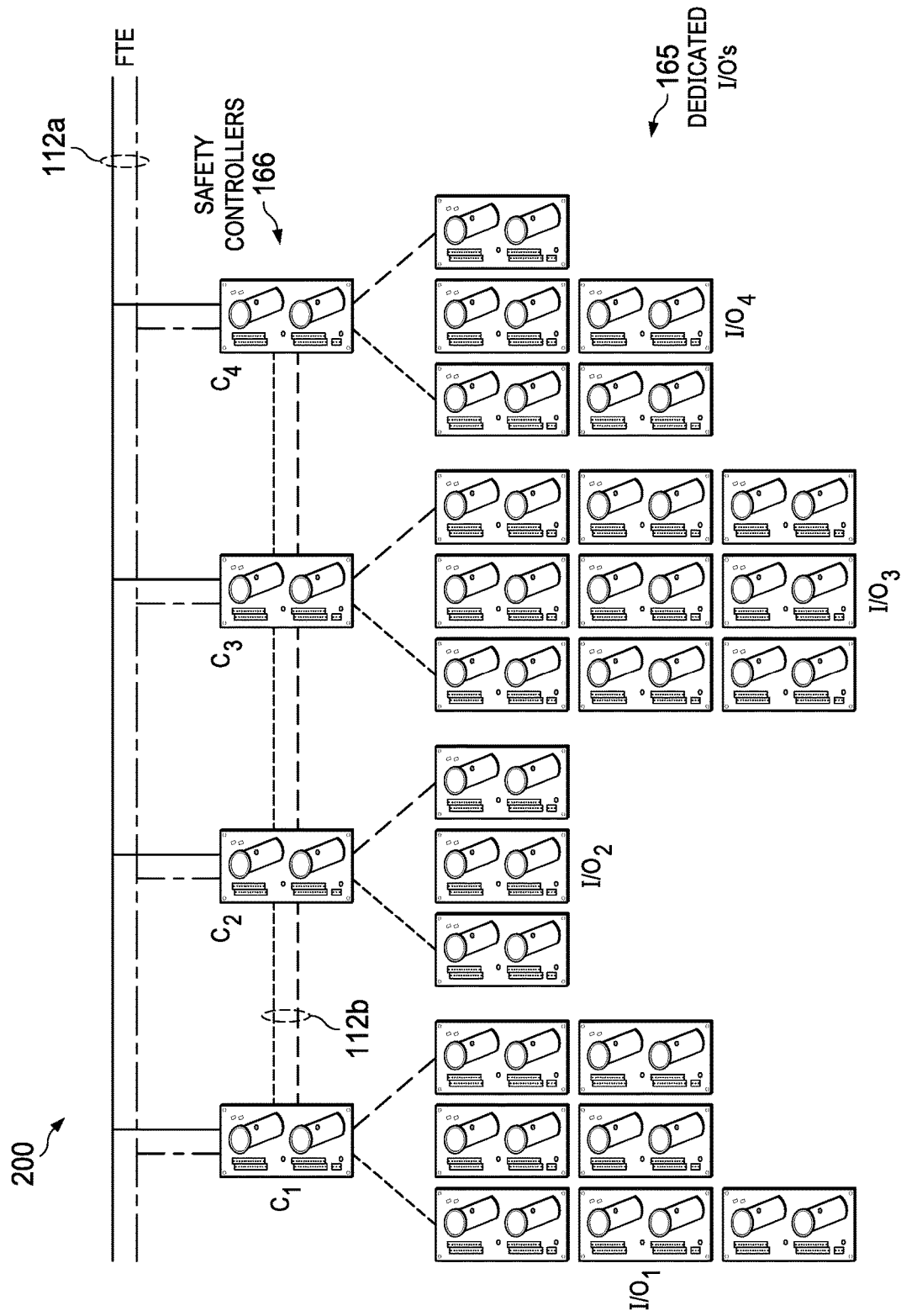
FIG. 2A depicts a known SIS arrangement having a plurality of safety controllers each having their own group of dedicated safety I/O modules.

FIG. 2A depicts a known SIS arrangement 200 having a plurality of safety controllers shown as 166 each having their own group of dedicated safety I/O modules collectively shown as dedicated I/Os 165, where a plurality of the I/O modules from the dedicated I/Os 165 are provided as dedicated I/Os 165 to each safety controller 166 configured so that there are spare dedicated I/O modules for each safety controller 166. The safety controllers 166 are shown connected together by the safety network 112b, and by the network 112a (e.g. Honeywell FTE) which connects the safety controllers 166 to level 3 above (not shown).

The dedicated safety I/O modules 165 associated with the safety controller 1 shown as $C_1$ are collectively shown as $I/O_1$, the dedicated safety I/O modules associated with the safety controller 2 shown as $C_2$ are collectively shown as $I/O_2$, the dedicated safety I/O modules associated with the safety controller 3 shown as $C_3$ are collectively shown as $I/O_3$, and the dedicated safety I/O modules associated with the safety controller 4 shown as $C_4$ are collectively shown as $I/O_4$. In SIS arrangement 200, the respective safety controllers $C_1$-$C_4$ can only utilize their dedicated own safety I/O modules, so that for example $C_2$ can only utilize any of the safety I/O modules in $I/O_2$, but cannot use any of the safety I/O modules in $I/O_1$, $I/O_3$ or in $I/O_4$. Safety network 112b is an optional independent network used to exchange safety-critical data between the respective safety controllers 166.

Figure 2B:
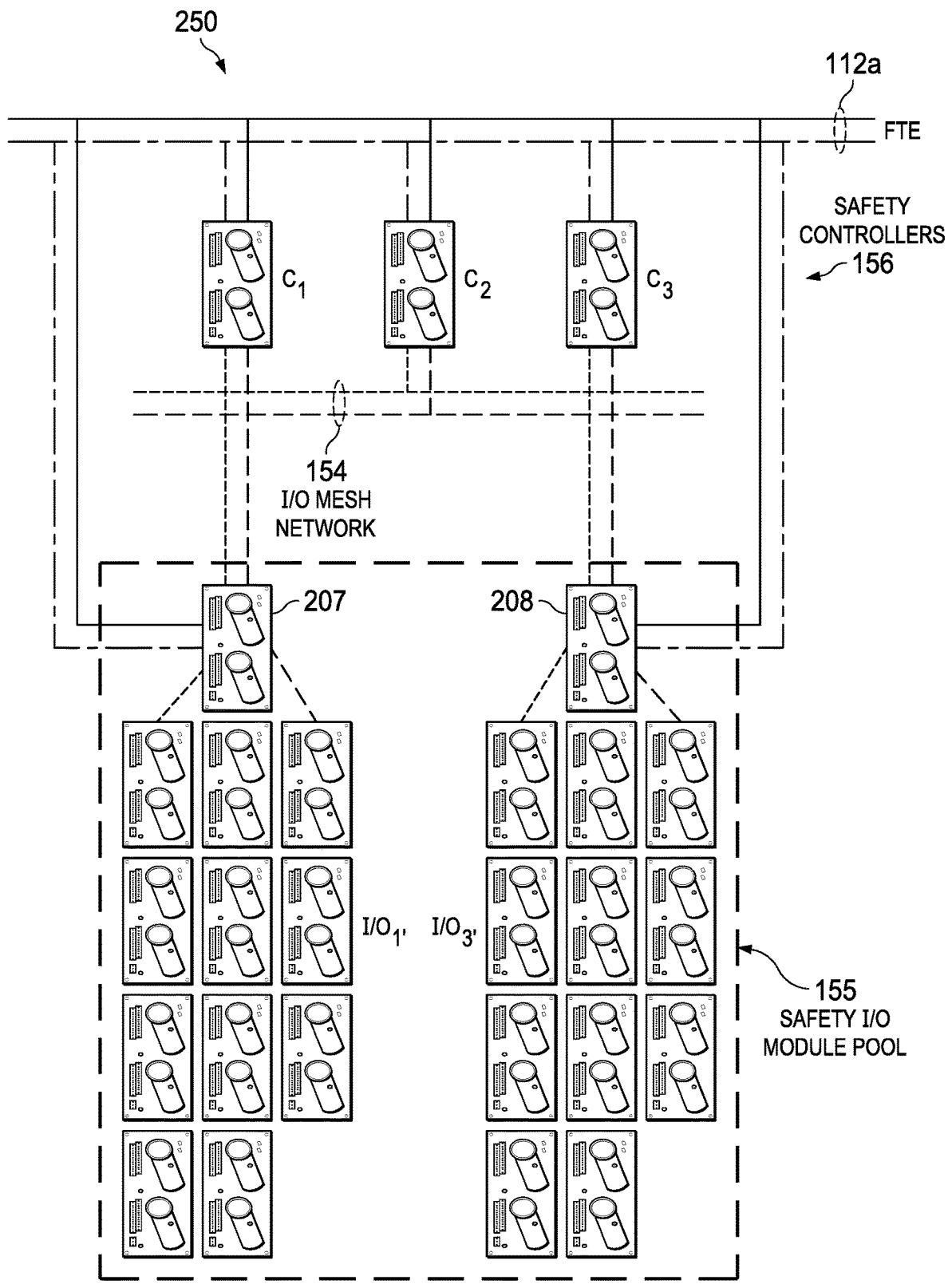
FIG. 2B depicts a disclosed SIS arrangement having a plurality of safety controllers enabled by a disclosed I/O mesh network to share a pool of safety I/O modules.

FIG. 2B depicts a disclosed SIS arrangement 250 having plurality of safety controllers 156 shown as $C_1$, $C_2$ and $C_3$, enabled by a disclosed I/O mesh network 154 which replaces the safety network 112b in the known SIS arrangement 200 shown in FIG. 2A. The I/O mesh network 154 makes available any of the safety I/O modules in the safety I/O module pool 155 to any of the plurality of safety controllers 156. Although not shown in FIG. 2B, optionally there can also be another network above the safety controllers 156 shown above in FIGS. 1A, 1B and 1C as network 109 that is coupled above between the safety controllers 156 and the switch/firewall 151. SIS arrangement 250 is shown including optional I/O pool data concentrators 207, 208 which are separate from the safety controllers 156. The I/O pool data concentrators 207, 208 reduce the amount of communication between the safety I/O module pool 155 and the safety controllers 156, which improves overall system response time.

The I/O pool data concentrators 207, 208 handle all communications between the safety controllers 156 and the I/O modules in the I/O pool 155 it is responsible for. The I/O pool data concentrators 207, 208 are configured to combine all input information from the safety I/O modules in its I/O pool 155 requested by a safety controller 156 into a single communication message for that safety controller 156. Similarly, the I/O pool data concentrators 207, 208 send the individual output information received from the safety controllers 156 targeted for one safety I/O module in its I/O pool 155 as a single message to that safety I/O module. This is done for each of the safety controllers 156 in the pool of safety controllers 156, and safety I/O modules in the I/O pool 155 of that I/O pool data concentrator. The I/O mesh network 154 is configured to share any of the safety I/O modules in the pool of safety I/O modules 155 to any of the safety controllers 156 shown as $C_1$, $C_2$, and $C_3$.

The I/O mesh network 154 using optional I/O pool data concentrators 207 and 208 thus enables any of the safety controllers 156 to have access to any of the I/O points of the safety I/O modules in the I/O pool 155. As in the SIS arrangement 200 shown in FIG. 2A, SIS arrangement 250 has the respective safety controllers 156 shown connected together by the I/O mesh network 154, and by FTE 112a which connects to levels 3 and above. The I/O mesh network 154 can also be used to exchange safety-critical data between respective ones of the safety controllers 156.

A limitation of conventional SIS for industrial automation systems such as the SIS arrangement 200 shown in FIG. 2A described above, is that each safety controller 166 is dedicated or bound to a specific safety I/O module and the set of channels and field devices associated with the specific safety I/O module. Sets of channels and associated field devices are thus fixed by the safety I/O module's type, the physical location of the safety I/O module, or the network location of the safety I/O module. Safety module flexibility is therefore limited. This Disclosure removes that limitation.

The plurality of safety I/O modules generally each include a plurality of I/O channels so that any of the plurality of safety controllers 156 enabled by the I/O mesh network 154 can become coupled to any of the I/O channels. In this arrangement, each safety controller 156 is configured to receive signals from and transmit signals to any one of the plurality of channels within the safety I/O module pool 155, wherein the channels are connected by the I/O mesh network 154 in a mesh topology. Just as each channel represents a datum of a process, that datum is destined for a specific safety controller 156. With the channels configured in a mesh topology enabled by the I/O mesh network 154 that is coupled between the safety I/O module pool 155 and the safety controllers 156, the specific datum in a specific channel can be connected to the proper safety controllers 156 regardless of which particular one of the safety I/O modules in the safety I/O module pool 155 that the channel resides in. In other words, data collected from the field devices (see sensors 152a and actuators 152b shown in FIG. 1C) via channels is available to any safety controller 156 through the mesh topology of the channels. Similarly, signals or instructions from the safety controller 156 may be made available to any channel through the mesh topology of the channels.

Figure 3:
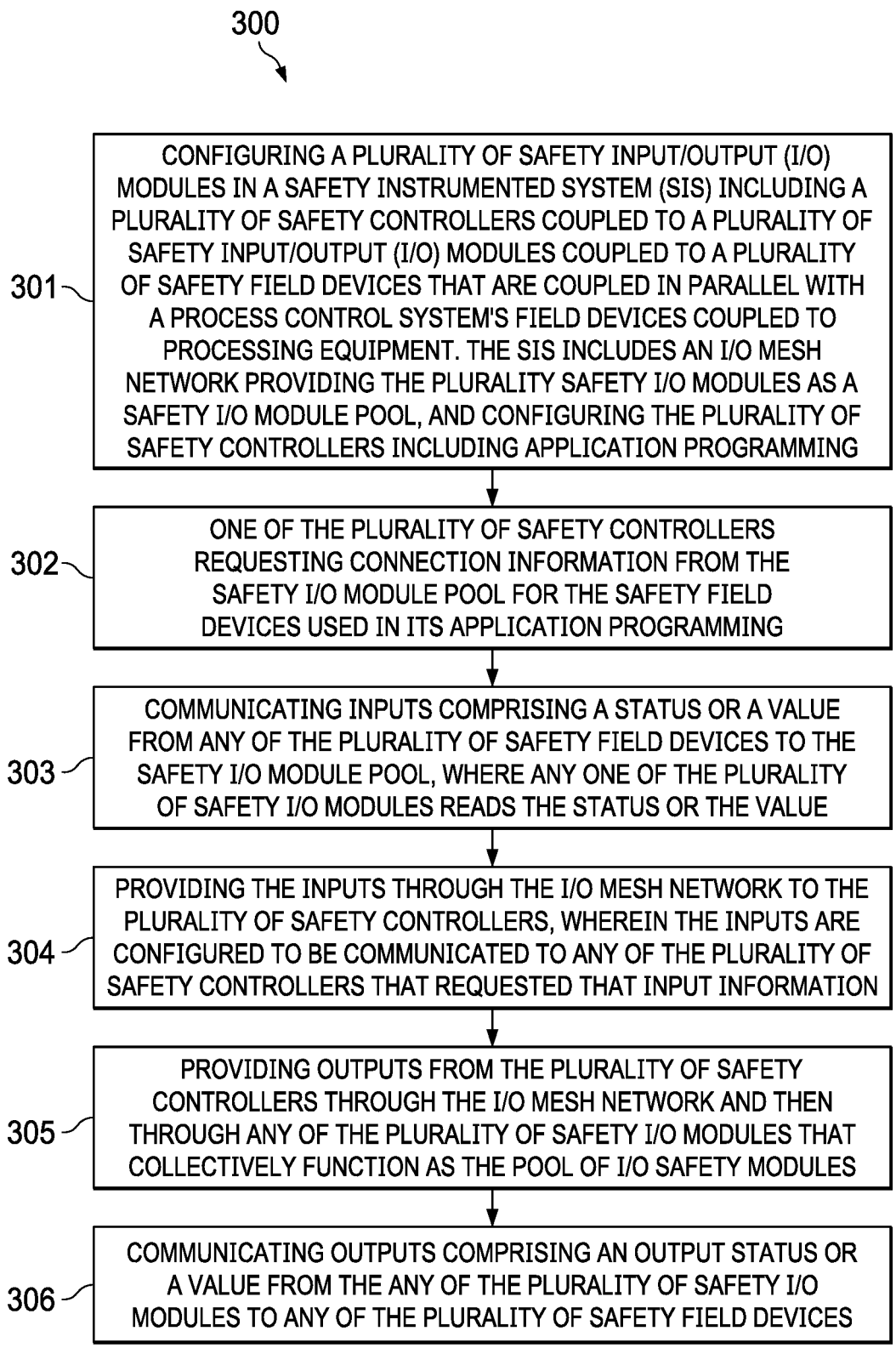
FIG. 3 is a flowchart for a method of operating a SIS having a disclosed I/O mesh network that enables a plurality of safety controllers to share a pool of safety I/O modules.

FIG. 3 is a flowchart for a method 300 of operating a SIS having a disclosed I/O mesh network that enables the safety controllers to share a plurality of safety I/O modules in a safety I/O module pool. Step 301 comprises configuring a plurality of safety I/O modules in a SIS 100 including a plurality of safety controllers 156, where the plurality of safety I/O modules 155 are coupled to a plurality of safety field devices 152a, 152b that are coupled in parallel with respect to the process control system's field devices 102a, 102b to the processing equipment 107. The SIS includes an I/O mesh network providing the plurality of safety I/O modules as a safety I/O module pool, and the plurality of safety controllers are configured including their application programming.

The application programming uses the signal identifications for the safety field devices associated with the processing equipment 107. Step 302 comprises one of the safety controllers requesting connection information from the safety I/O module pool for the safety field devices used in its application programming. This connection information is needed to optimize the communication messages and provide it with the necessary protection parameters required for safety-critical communications.

Step 303 comprises communicating inputs comprising a status or a value (and optionally other input related information such as diagnostic information on the I/O channel) from any of the plurality of safety field devices to the safety I/O module pool, where any one of the plurality of safety I/O modules reads the status or the values. Step 304 comprises providing the inputs through the I/O mesh network to the plurality of safety controllers, wherein the inputs are configured to be communicated to any of the plurality of safety controllers that requested that input information.

Step 305 comprises providing outputs from the plurality of safety controllers through the I/O mesh network and then through any of the plurality of safety I/O modules that collectively function as the pool of safety I/O modules. Step 306 comprises communicating the outputs comprising an output status or a value from any of the plurality of safety I/O modules to any of the plurality of safety field devices. As noted above, when the plurality of safety I/O modules each provide a plurality of I/O channels, the I/O mesh network can enable any of the plurality of safety controllers 156 to become coupled to any of the I/O channels in the safety I/O module pool 155. The selecting can comprise safety control applications built on the plurality of safety controllers using information from the safety field devices, wherein the plurality of safety controllers request from the plurality of safety I/O modules connection information regarding any of the safety field devices and then build a logical network connection between the plurality of safety I/O modules and the plurality of safety controllers.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A safety instrumented system (SIS), comprising:
   a plurality of safety controllers;
   a plurality of safety input/output (I/O) modules coupled to a plurality of safety field devices that are coupled in parallel with field devices in a process control system relative to processing equipment that is configured and controlled to run a process, and
   an I/O mesh network connected between the plurality of safety controllers and the plurality of safety I/O modules,
   wherein the I/O mesh network is configured for selecting at least one of the plurality of safety controllers to become coupled to at least one of the plurality of safety I/O modules to function as a pool of safety I/O modules so that the at least one of the plurality of safety controllers are configurable to receive sensor signals from and transmit control signals to at least one of the safety field devices,
   wherein the plurality of safety field devices are for monitoring at least a portion of process variables for the process so that when one of the plurality of safety controllers recognizes a hazardous or potentially hazardous condition regarding the processing equipment, the SIS is configured to independently take action to keep the processing equipment under control or bring it to a safe state.

2. The SIS of claim 1, wherein the plurality of safety I/O modules each include a plurality of I/O channels so that the at least one of the plurality of safety controllers can become coupled to at least one of the I/O channels.

3. The SIS of claim 1, wherein the process control system includes a plurality of controllers coupled by a I/O network to a plurality of I/O modules, or wherein each of the plurality of I/O modules are coupled to a portion of the field devices.

4. The SIS of claim 3, wherein the I/O network comprises a second I/O mesh network that is coupled to the I/O mesh network, wherein the plurality of controllers are coupled by the I/O mesh network for enabling the at least one of the plurality of controllers to be coupled to the at least one of the plurality of I/O modules.

5. The SIS of claim 1, wherein the plurality of safety controllers comprises an application control system, a field device manager, a remote terminal unit, an embedded controller, a programmable logic controller, or a device for receiving control information and sending instructions to the safety field devices.

6. The SIS of claim 1, wherein the I/O mesh network comprises a dedicated communications network over which information is exchanged between the plurality of safety controllers and the plurality of safety I/O modules via a dedicated safety protocol that is configured to exchange information between the plurality of safety controllers and the safety I/O modules.

7. The SIS of claim 1, wherein the selecting from the at least one the plurality of safety controllers comprises safety control applications built on the plurality of safety controllers using information from the safety field devices, wherein the plurality of safety controllers request from the plurality of safety I/O modules connection information regarding the at least one of the safety field devices and then build a logical network connection between the plurality of safety I/O modules and the plurality of safety controllers.

8. A method, comprising:
configuring a plurality of input/output (I/O) safety modules in a safety instrumented system (SIS) including a plurality of safety controllers coupled to a plurality of safety input/output (I/O) modules coupled to a plurality of safety field devices that are coupled in parallel with a process control system's field devices coupled to processing equipment, the SIS including an I/O mesh network providing the safety I/O modules as a safety I/O module pool, and configuring the plurality of safety controllers including application programming;
one of the plurality of safety controllers requesting connection information from the safety I/O module pool for the safety field devices used in its application programming;
communicating inputs comprising a status or a value from at least one of a plurality of safety field devices to the plurality of safety I/O modules wherein one of the plurality of safety I/O modules reads the status or the value;
providing the inputs through the I/O mesh network to the plurality of safety controllers, wherein the inputs are configured to be communicated to at least one of the plurality of safety controllers that requested that information;
providing outputs from the plurality of safety controllers through the I/O mesh network and then through at least one of the plurality of safety I/O modules that collectively function as the pool of safety I/O modules, and
communicating outputs comprising an output status or a value from the at least one of the plurality of safety I/O modules to at least one of the plurality of safety field devices.

9. The method of claim 8, wherein the plurality of safety I/O modules each include a plurality of I/O channels so that the at least one of the plurality of safety controllers can become coupled to at least one of the I/O channels.

10. The method of claim 8, wherein the process control system includes a plurality of controllers coupled by a I/O network to a plurality of I/O modules, wherein each of the plurality of I/O modules are coupled to a portion of the field devices.

11. The method of claim 10, wherein the I/O network comprises a second I/O mesh network that is coupled to the I/O mesh network, wherein the plurality of controllers are coupled by the I/O mesh network for enabling the at least one of the plurality of controllers to be coupled to the at least one of the plurality of I/O modules.

12. The method of claim 8, wherein the I/O mesh network comprises a dedicated communications network over which information is exchanged between the plurality of safety controllers and the plurality of safety I/O modules via a dedicated safety protocol that configured to exchange information between the plurality of safety controllers and the safety I/O modules.

13. The method of claim 8, wherein the I/O mesh network comprises a dedicated communications network over which information is exchanged between the plurality of safety controllers and the plurality of safety I/O modules via a dedicated safety protocol that configured to exchange information between the plurality of safety controllers and the safety I/O modules.

14. A process automation system, comprising:
a process control system including a plurality of controllers coupled to I/O modules coupled to field devices, that are coupled to processing equipment;
a safety instrumented system (SIS), comprising:
a plurality of safety controllers;
a plurality of safety input/output (I/O) modules coupled to a plurality of safety field devices that are coupled to the processing equipment, where the SIS has its own safety controllers and safety field devices that are connected in parallel to the field devices, and
an I/O mesh network connected between the plurality of safety controllers and the plurality of safety I/O modules,
wherein the I/O mesh network is configured for selecting at least one of the plurality of safety controllers to become coupled to at least one of the plurality of safety I/O modules to function as a pool of safety I/O modules so that the at least one of the plurality of safety controllers are configurable to receive sensor signals from and transmit control signals to at least one of the safety field devices.

15. The process automation system of claim 14, wherein the plurality of safety I/O modules each include a plurality of I/O channels so that the at least one of the plurality of safety controllers can become coupled to the at least one of the I/O channels.

16. The process automation system of claim 14, wherein the process control system includes a plurality of controllers coupled by a I/O network to a plurality of I/O modules, wherein each of the plurality of I/O modules are coupled to a portion of the field devices, wherein the I/O network comprises a second I/O mesh network that is coupled to the I/O mesh network, wherein the plurality of controllers are coupled by the I/O mesh network for enabling the at least one of the plurality of controllers to be coupled to the at least one of the plurality of I/O modules.

17. The process automation system of claim 14, wherein the I/O mesh network comprises a dedicated communications network over which information is exchanged between the plurality of safety controllers and the plurality of safety I/O modules via a dedicated safety protocol that configured to exchange information between the plurality of safety controllers and the safety I/O modules.

* * * * *